United States Patent
Feki et al.

(10) Patent No.: US 10,951,354 B2
(45) Date of Patent: Mar. 16, 2021

(54) METHOD AND APPARATUS FOR ADJUSTING CHANNEL QUALITY INFORMATION (CQI) CONSIDERING HANDOVER

(71) Applicant: HUAWEI TECHNOLOGIES CO., LTD., Shenzhen (CN)

(72) Inventors: Afef Feki, Munich (DE); Sami Mekki, Boulogne Billancourt (FR); Mustapha Amara, Boulogne Billancourt (FR)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/562,528

(22) Filed: Sep. 6, 2019

(65) Prior Publication Data

US 2019/0393981 A1 Dec. 26, 2019

Related U.S. Application Data (63) Continuation of application No. PCT/EP2017/055344, filed on Mar. 7, 2017.

(51) Int. Cl.
*H04L 1/00* (2006.01)
*H04B 17/336* (2015.01)
(Continued)

(52) U.S. Cl.
CPC ......... *H04L 1/0026* (2013.01); *H04B 17/336* (2015.01); *H04W 36/0055* (2013.01); *H04W 36/20* (2013.01)

(58) Field of Classification Search
CPC ............... H04L 1/0026; H04B 17/336; H04W 36/0055; H04W 36/20
See application file for complete search history.

(56) References Cited

U.S. PATENT DOCUMENTS 8,675,794 B1   3/2014 Perets et al.
2006/0105717 A1   5/2006 Kwon et al.
(Continued)

FOREIGN PATENT DOCUMENTS

CN   101420745 A   4/2009
CN   101808369 A   8/2010
(Continued)

OTHER PUBLICATIONS

Xu, "Strategies for Wireless Network Control with Applications to LTE", Dec. 15, 2014, total 135 pages, available at http://publications.rwth-aachen.de/record/480454/files/480454.pdf.
(Continued)

*Primary Examiner* — Ian N Moore
*Assistant Examiner* — Rushil Parimal Sampat
(74) *Attorney, Agent, or Firm* — Maier & Maier, PLLC (57) ABSTRACT

Embodiments relate to an apparatus for adjusting channel quality indicator measurements of a channel between a client device and a serving device within a wireless communication system. The apparatus includes a controller adapted to receive, from the client device, a first information and, when the client device is in a handover zone, a second information. The controller is further adapted to transmit according to a switching sequence either the first information alone or the first information together with the second information. The apparatus also includes an adjustment function entity adapted to receive the first information together with the second information and adapted to adjust the first information based on the second information by modifying it or keeping it unchanged. The first information is related to the CQI measurements, while the second information is related to a handover (HO).

11 Claims, 10 Drawing Sheets

(51) Int. Cl.
*H04W 36/00* (2009.01)
*H04W 36/20* (2009.01)

(56) References Cited

U.S. PATENT DOCUMENTS

| | | | |
|---|---|---|---|
| 2013/0195097 A1 | 8/2013 | Zheng et al. | |
| 2013/0210434 A1* | 8/2013 | Dimou | H04W 36/00837 455/436 |
| 2013/0310037 A1* | 11/2013 | Ji | H04L 5/0091 455/436 |
| 2015/0038156 A1 | 2/2015 | Kilpatrick, II et al. | |
| 2015/0038180 A1 | 2/2015 | Quick, Jr. et al. | |

FOREIGN PATENT DOCUMENTS

| | | |
|---|---|---|
| CN | 105409134 A | 3/2016 |
| CN | 105432118 A | 3/2016 |
| CN | 105634682 A | 6/2016 |
| EP | 2959609 B1 | 6/2018 |
| EP | 2587707 B1 | 1/2019 |
| GB | 2504739 A | 2/2014 |
| WO | 2010/120217 A1 | 10/2010 |
| WO | 2011/160570 A1 | 12/2011 |

OTHER PUBLICATIONS

Donthi et al., "An Accurate Model for EESM and its Application to Analysis of CQI Feedback Schemes and Scheduling in LTE", IEEE Transactions on Wireless Communications, 2011 IEEE, Oct. 2011, pp. 3436-3448, vol. 10, No. 10.
Wang, "Downlink Shared Channel Evaluation of LTE System", CHALMERS, Thesis for the degree of Master of Science, Department of Signals and Systems Chalmers University of Technology, 2013, total 51 pages, Gothenburg, Sweden.
Zheng et al., "A Modified ARIMA Model for CQI Prediction in LTE-based Mobile Satellite Communications", 2012 IEEE International Conference on Information Science and Technology, Mar. 23-25, 2012, pp. 822-826, Wuhan, Hubei, China.
Cui et al., "First Order Adaptive IIR Filter for CQI Prediction in HSDPA", This full text paper was peer reviewed at the direction of IEEE Communications Society subject matter experts for publication in the WCNC 2010 proceedings., 2010 IEEE, total 5 pages.
Akl et al., "Compensating for CQI Aging by Channel Prediction: The LTE Downlink", Globecom 2012—Wireless Communications Symposium, 2012 IEEE, Dec. 3-7, 2012, p. 4821-4827.
Jeon et al., "Channel Adaptive CQI Reporting Schemes for HSDPA Systems", IEEE Communications Letters, 2006 IEEE, Jun. 2006, pp. 459-461, vol. 10, No. 6.
Kim et al. "Multiuser CQI Prediction Based on Quantization Error Feedback for Massive MIMO Systems", 2015 International Workshop on Emerging MIMO Technologies with 2D Antenna Array for 4G LTE-Advanced and 5G, ICNC Workshop, 2015 IEEE, Feb. 16-19, 2015, pp. 32-36.
Abdulhasan et al., "A Channel Quality Indicator (CQI) Prediction Scheme Using Feed Forward Neural Network (FF-NN) technique for MU-MIMO LTE system", 2014 IEEE 2nd International Symposium on Telecommunication Technologies (ISTT), Nov. 24-26, 2014, pp. 17-22, Langkawi, Malaysia.
Badic et al., "Analysis of CQI prediction for MU-MIMO in LTE Systems", Vehicular Technology Conference (VTC Spring), 2012 IEEE, May 6-9, 2012, pp. 1-5.
Bruno et al., "Robust Adaptive Modulation and Coding (AMC) Selection in LTE Systems Using Reinforcement Learning", in Vehicular Technology Conference (VTC Fall), IEEE 2014, Sep. 14-17, 2014, pp. 1-6.
Mekki et al., "Channel Gain Prediction for Wireless Links With Kalman Filters and Expectation-Maximization", IEEE Wireless Conference and Networking Conference (WCNC 2016) Track 1: PHY and Fundamentals, 2016 IEEE, total 7 pages.
Shen et al., "Short Range Wireless Channel Prediction Using Local Information", 2003 IEEE, Nov. 2013, pp. 1147-1151, vol. 1.
Herman et al., "A3-Based Measurements and Handover Model for NS-3 LTE", Mobility 2013 : The Third International Conference on Mobile Services, Resources, and Users, IARIA, 2013, pp. 20-23, ISBN: 978-1-61208-313-1.
Arshad, "LTE System Level Performance in the Presence of CQI Feedback Uplink Delay and Mobility", 2015 IEEE, 2015, total 5 pages.
3GPP, "3rd Generation Partnership Project; Technical Specification Group Radio Access Network; Evolved Universal Terrestrial Radio Access (E-UTRA); Physical channels and modulation (Release 13)", 3GPP TS 36.211, V13.4.0, Dec. 2016, total 171 pages.
3GPP, "3rd Generation Partnership Project; Technical Specification Group Radio Access Network; Evolved Universal Terrestrial Radio Access (E-UTRA); Physical layer procedures (Release 14)", 3GPP TS 36.213, V14.1.0, Dec. 2016, total 414 pages.
3GPP, "3rd Generation Partnership Project; Technical Specification Group Radio Access Network; Evolved Universal Terrestrial Radio Access (E-UTRA); Physical layer; Measurements (Release 14)", 3GPP TS 36.214, V14.1.0, Dec. 2016, total 20 pages.

* cited by examiner

METHOD AND APPARATUS FOR ADJUSTING CHANNEL QUALITY INFORMATION (CQI) CONSIDERING HANDOVER

CROSS-REFERENCE TO RELATED APPLICATIONS

This application is a continuation of International Application No. PCT/EP2017/055344, filed on Mar. 7, 2017, the disclosure of which is hereby incorporated by reference in its entirety.

TECHNICAL FIELD

Embodiments of the invention relate to the field of wireless communications, and more particularly to an adjustment of the quality of a communication channel between a client device and a serving device.

BACKGROUND

In current radio access technologies, the communication systems automatically adapt their transmission to their propagation channel. As those channels are highly unstable, frequent feedbacks are performed through channel quality indicator (CQI) measurements performed on the transmitted data in the downlink. These measurements, which are performed at the user equipment (UE) device, are then transformed into a single scalar value, which is fed back to the base station (BS) in order to adjust and select, for example, the appropriate modulation and coding scheme (MCS) used to serve the concerned UE device. The computation of the CQI is based on the signal-to-interference-plus-noise ratio (SINR), which takes different degradation terms, such as propagation path-loss, shadowing, fast fading and random inter-cell interference factors, into consideration.

This interference can usually be regarded as a noise mainly caused by the use of inter-cell interference coordination schemes. Nevertheless, this assumption does not hold anymore when the UE device gets closer to the cell edge. In fact, in these overlapping regions, the interference component due to the transmission of neighboring base stations becomes almost equivalent to the useful signal received from the serving base station and aimed at the considered UE device.

In these circumstances, the SINR is highly affected by the interference component. However, the perceived interference level highly depends on the load of the neighboring base stations, which is related to the requested traffic of their attached UE devices as well as their respective schedulers. As a result, the reported CQI at a given time slot N can be drastically different from the CQI at a later time N+1.

Moreover, there is always a delay between the instant when the measurements are performed and the instant when they are actually used in the network at the BS level. Due to this delay, the network performance can be prejudicially affected. In this regard, the document entitled: Z. Shen, J. G. Andrews and B. L. Evans, "Short range wireless channel prediction using local information", in Proceedings IEEE Asilomar Conference on Signals, Systems and Computers, vol. 1, pp. 1147-1151, Nov. 9-12, 2003, Pacific Grove, Calif., USA, discloses a capacity loss up to 17% at a Doppler frequency of 10 Hz due to delayed channel state information (CSI) measurements.

Given the above statements, the performance loss is even more important at the cell edge and the usage of the CQI that has been fed back at a time slot N would become obsolete at a later time slot N+1. This might highly underestimate the interference and thus lead to a transmission failure (e.g., a call drop) or, conversely, lead to an over estimation of the interference component, thereby drastically reducing the achievable rate.

Such a problem has been widely addressed in the prior art and the common solutions point towards the CQI prediction and its target usage such as the adaptive modulation and coding (AMC) design optimization. In general, the proposed solutions consider a set of observations as an input. Based on these input observations collected up to an instant N, an extrapolation is carried out in order to estimate the potential values at the next instants N+1, . . . , N+L, where L is the prediction horizon value.

However, all these solutions only consider as input the CQI as reported by the attached UE devices, whereas there is an extra information that is available at the BS and can be potentially helpful to better assess the channel quality. This additional information is fed back by the UE device during a handover (HO) procedure and is related to the channel quality through a measurement of the reference signal received power (RSRP) and/or the reference signal received quality (RSRQ). Unlike the CQI, these channel quality indicators (RSRP, RSRQ) are independently computed and performed on signals that are not affected by the random interference since the measurements are achieved on control channels.

SUMMARY

It is therefore an object of embodiments of the invention to provide a better assessment of the channel quality by adjusting the CQI measurements of a channel between a client device and a serving device within a handover situation.

The object is achieved by the features of the independent claims. Further embodiments of the invention are apparent from the dependent claims, the description and the drawings.

According to a first aspect, an embodiment relates to an apparatus for adjusting channel quality indicator (CQI) measurements of a channel between a client device and a serving device within a wireless communication system. The apparatus includes a controller and an adjustment function entity. The controller is adapted to receive, from the client device, a first information and, when the client device is in a handover zone, a second information, and to transmit, according to a switching sequence, either the first information alone or the first information together with the second information. The adjustment function entity is adapted to receive, from the controller according to the switching sequence, the first information together with the second information, and to adjust the first information based on the second information by modifying the first information or keeping it unchanged. The first information is related to the CQI measurements and the second information is related to the handover.

Thereby, the CQI measurements through the first information can be adjusted when the client device enters a handover zone. The apparatus may be an adjustment device including the controller and the adjustment function entity. The first information may include conventional CQI adjustment inputs such as the CQI measurements and their target usage such as a radio resource scheduling and an AMC, and the second information may include reference signal measurements such as RSRP and RSRQ, along with any handover-related event such as a verification of a predefined handover event condition.

According to a first implementation of the apparatus according to the first aspect, the controller is adapted to deactivate any adjustment or correction when the client device is in the handover zone, and the first information alone is transmitted towards an output of the apparatus.

Thereby, the second information is taken into consideration in order to detect that the client device enters the handover zone, and the deactivation of any adjustment or correction in the network may allow the system performance to be improved if the gap between the used first information related to a CQI measurement and an adjusted first information related to the CQI measurement were to be huge. Thus, the first information alone corresponds to the first information received by the controller when the client device is in the handover zone, and is transmitted as such from the controller towards an output of the apparatus.

According to a second implementation of the apparatus according to the first aspect, the controller is adapted to activate the adjustment function entity when the client device is in the handover zone, and the first information together with the second information are transmitted towards the adjustment function entity.

Thereby, the additional information brought by the second information may be used by the adjustment function entity in order to adjust the first information, and thereby the CQI measurements. The adjusted first information resulting from the adjustment of the first information based on the second information is transmitted towards the output of the apparatus.

According to a third implementation of the apparatus according to any one of the implementations of the first aspect, the adjustment of the first information is based on a confidence interval.

According to a fourth implementation of the apparatus according to the third implementation of the first aspect, the adjustment function entity is adapted to adjust the first information by deriving an estimated signal-to-noise ratio (SNR) from the first information, by computing the confidence interval around the estimated SNR, by deriving an estimated SINR from the second information, by keeping the first information unchanged if the estimated SINR is within the confidence interval, and by modifying the first information through a correction into a corrected first information if the estimated SINR is outside the confidence interval.

According to a fifth implementation of the apparatus according to the third implementations of the first aspect, the adjustment function entity is adapted to adjust the first information by performing a prediction procedure applied to the first information as to obtain a predicted first information, the prediction procedure including an estimation of the first information at a predefined future time, by performing another prediction procedure applied to the second information as to obtain a predicted second information, the other prediction procedure including an estimation of the second information at the predefined future time, by performing a quantization procedure applied to the predicted second information as to obtain a quantized predicted second information, by computing the confidence interval around the predicted first information, if the quantized predicted second information is within the confidence interval, by keeping the predicted first information unchanged and modifying the first information into the predicted first information, and if the quantized predicted second information is outside the confidence interval, by correcting the predicted first information into a corrected predicted first information and modifying the first information into the corrected predicted first information.

The above object is also solved in accordance with a second aspect.

According to the second aspect, the invention relates to a client device including the apparatus as claimed in any one of the implementations of the first aspect.

Thereby, the apparatus for adjusting the CQI measurements of a channel between the client device and the serving device may be located inside the client device instead of inside the serving device.

The above object is also solved in accordance with a third aspect.

According to the third aspect, the invention relates to a serving device including the apparatus as claimed in any one of the implementations of the first aspect.

Thereby, the apparatus for adjusting the CQI measurements of a channel between the client device and the serving device may be located inside the serving device instead of inside the client device.

According to a first implementation of the serving device according to the third aspect, the serving device is a base station or an evolved nodeB (eNodeB) or any other network-capable entity.

Thereby, the apparatus may be located at or moved towards any entity of the network level, for example, in the case of a cloud radio access network RAN.

The above object is also solved in accordance with a fourth aspect.

According to the fourth aspect, the invention relates to a wireless communication system including one or more client devices as individually claimed in the second aspect, and one or more devices communicating with the one or more client devices and being serving devices with respect to the one or more client devices.

The above object is also solved in accordance with a fifth aspect.

According to the fifth aspect, the invention relates to a wireless communication system including one or more serving devices as individually claimed in any one of the third aspect and the first implementation of the serving device according to the third aspect, and one or more client devices communicating with the one or more serving devices.

The above object is also solved in accordance with a sixth aspect.

According to the sixth aspect, the invention relates to a method including the step of receiving, at a controller and from the client device, a first information and, when the client device is in a handover zone, a second information, the step of transmitting, according to a switching sequence, either the first information alone or the first information together with the second information, the step of receiving, at an adjustment function entity and from the controller according to the switching sequence, the first information together with the second information, and the step of adjusting, at the adjustment function entity, the first information based on the second information by modifying said first information or keeping it unchanged. The first information is related to the CQI measurements and the second information is related to the handover.

According to a first implementation of the method according to the sixth aspect, the method includes deactivating any adjustment or correction when the client device is in the handover zone, and the first information alone is transmitted towards an output of the apparatus.

According to a second implementation of the method according to the sixth aspect, the method includes activating the adjustment function entity when the client device is in the handover zone, and the first information together with the second information are transmitted towards the adjustment function entity.

According to a third implementation of the method according to the sixth aspect or any one of the implementations of the sixth aspect, the step of adjusting the first information is based on a confidence interval.

According to a fourth implementation of the method according to the third implementation of the sixth aspect, the step of adjusting the first information includes the step of deriving an estimated SNR from the first information, the step of computing the confidence interval around the estimated SNR, the step of deriving an estimated SINR from the second information, the step of keeping the first information unchanged if the estimated SINR is within the confidence interval, and the step of modifying the first information through a correction into a corrected first information if the estimated SINR is outside the confidence interval.

According to a fifth implementation of the method according to the third or fourth implementation of the sixth aspect, the step of adjusting the first information includes the step of performing a prediction procedure applied to the first information as to obtain a predicted first information, the prediction procedure including an estimation of the first information at a predefined future time, the step of performing another prediction procedure applied to the second information as to obtain a predicted second information, the other prediction procedure including an estimation of the second information at the predefined future time, the step of performing a quantization procedure applied to the predicted second information as to obtain a quantized predicted second information, the step of computing the confidence interval around the predicted first information, the step, if the quantized predicted second information is within the confidence interval, of keeping the predicted first information unchanged and modifying the first information into the predicted first information, and the step, if the quantized predicted second information is outside the confidence interval, of correcting the predicted first information into a corrected predicted first information and modifying the first information into the corrected predicted first information.

According to a sixth implementation of the method according to the fifth implementation of the sixth aspect, the step of performing another prediction procedure applied to the second information includes deriving an estimated SINR from the second information, and obtaining a predicted estimated SINR as the predicted second information.

It should be noted that, after the handover execution takes place and once the UE device is attached to the target base station (which hence becomes the new serving base station), the embodiments may also be used for an optimal initialization of the CQI measurements of the channel between this UE device and this new serving base station, and may by the way be used for an optimal initialization of the MCS selected. Indeed, estimated CQI measurements may, at the target base station (i.e., the new serving base station), be derived only from the handover-related measurements as the CQI measurements are not yet available. These estimated CQI measurements may then be adjusted (i.e., modified or kept unchanged) based on the available handover-related measurements using the method of the sixth aspect or any implementation of the method of the sixth aspect. Thereby, the convergence may be accelerated and the quality of the links may be enhanced in comparison with a static predefined initialization as it is done nowadays.

The above object is also solved in accordance with a seventh aspect.

According to the seventh aspect, the invention relates to a computer program including a program code for performing the method according to the sixth aspect or any one of the implementations of the sixth aspect when executed on a computer.

Thereby, the method can be performed in an automatic and repeatable manner.

The computer program can be performed by the above apparatuses.

More specifically, it should be noted that all the above apparatuses may be implemented based on a discrete hardware circuitry with discrete hardware components, integrated chips or arrangements of chip modules, or based on a signal processing device or chip controlled by a software routine or program stored in a memory, written on a computer-readable medium or downloaded from a network such as the Internet.

It shall further be understood that an embodiment of the invention can also be any combination of the above embodiments.

These and other aspects of embodiments of the invention will be apparent and elucidated with reference to the embodiments described hereinafter.

BRIEF DESCRIPTION OF DRAWINGS

In the following detailed portion of the disclosure, the invention will be explained in more detail with reference to the exemplary embodiments shown in the drawings, in which.

Identical reference signs are used for identical or at least functionally equivalent features.

DESCRIPTION OF EMBODIMENTS

Figure 1:
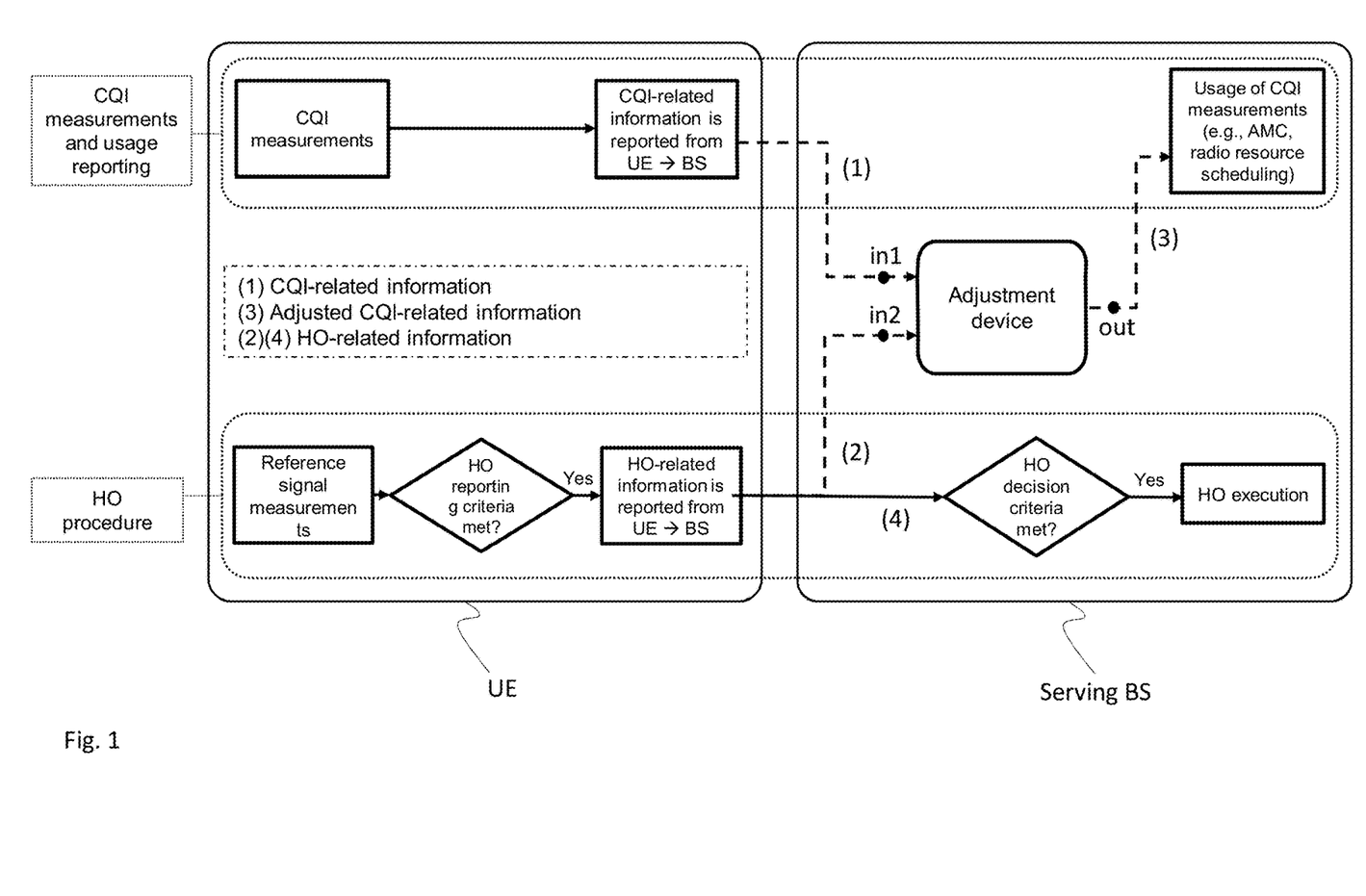
FIG. 1 shows a schematic block diagram illustrating the kinds of information reported from a UE device towards a base station according to an embodiment.

FIG. 1 shows a schematic block diagram illustrating the kinds of information reported from a UE device towards a base station according to an embodiment of the invention.

A client device may be specified as a UE device, which may be referred to as a client terminal or a mobile station. On the other hand, a serving device may be specified as a base station, which may be referred to as a cell. The client device, which is defined with an identification value (id value), may be attached to its serving device through a dedicated channel communication. However, the serving device of the invention is not limited to a base station, and may be extended to an eNodeB or any other network-capable entity.

Two measurement processes running independently from each other are depicted in FIG. 1. The first one is related to the CQI and its target usage (e.g., AMC, radio resource scheduling, and so forth). The second one is related to a handover) during which the UE device moves from a currently located radio zone towards a neighboring radio zone through an overlapping region of the cell edge region of the serving base station and the cell edge region of one or more neighboring or target base stations. A neighboring or target base station may be defined as a base station that is in the vicinity of the serving base station and becomes the "new" serving base station once the UE device is detached from said "old" serving base station to be attached to said "new" serving base station. Thus, the communication with the UE device may be handed over from a cell towards another one.

Referring to the first measurement process of FIG. 1, the UE device attached to the serving base station performs CQI measurements and reports an information related to these CQI measurements towards a first input terminal denoted by "in1" of an adjustment device located, in the present case, in the serving base station (step depicted by the number "1" in parentheses). It should be noted that, in another embodiment, the adjustment device may be located inside the UE device instead of inside the serving base station. The reported information, which will be designated hereafter as the first information, gives an indication on the performed CQI measurements and the way (e.g., AMC, radio resource scheduling, and so forth) in which they are intended to be used. Generally, the CQI measurements are mandatory in the network in order to allow their target usage to be achieved. As already cited, such usage may include an appropriate radio resource scheduling amongst a set of available radio resources, or an appropriate selection of a modulation and coding scheme (MCS) and its associated AMC for the downlink transmission from the serving base station towards the attached UE device. Here, the CQI measurements will be adjusted through an adjustment of the first information by the adjustment device, and will be then transmitted from the output terminal denoted by "out" of the adjustment device towards the depicted entity allowing their usage in the network.

Figure 2:
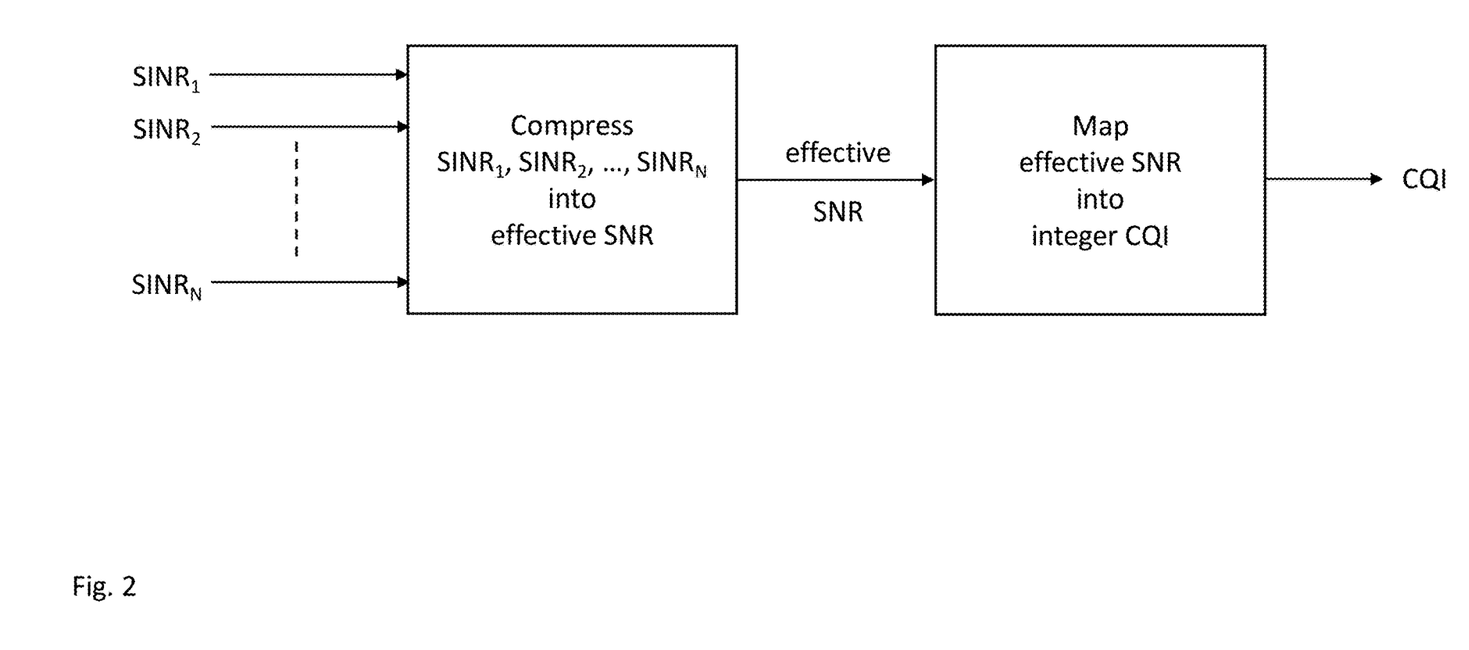
FIG. 2 shows a schematic block diagram illustrating a procedure for obtaining a CQI measurement according to an embodiment.

As shown in FIG. 2, these CQI measurements may be obtained using a link quality model such as the effective exponential SINR mapping (EESM), which allows compression of a set of instantaneous SINRs into a unique value corresponding to the effective SNR, and to then map the effective SNR into an integer CQI. It should be noted that models other than the EESM link quality model may also be applicable. The granularity of the CQI report may be divided into a wide-band and a sub-band (also referred to as a narrow band), and the respective wide-band CQI and sub-band CQI are eventually reported from the UE device towards the serving base station either in an aperiodic manner upon a predefined trigger or in a periodic manner with standard values ranging from 10 ms to 50 ms.

Referring to the second measurement process of FIG. 1, the UE device attached to the serving BS periodically performs measurements of signal level and quality on a reference signal by measuring either a RSRP or a RSRQ or both in evolved universal terrestrial radio access network (E-UTRAN). The definition of RSRP and RSRQ may, for example, be given by 3GPP TS 36.214 V13.0.0 Release 13. When a predefined handover condition, also referred to as a handover reporting criterion/event or a triggering criterion/event, is verified and met, the UE device periodically reports an information related to these reference signal measurements towards the serving base station. A typical reporting period value may, for example, be equal to 50 ms. The predefined HO condition may be a long term evolution (LTE) event based upon either RSRP or RSRQ, such as the LTE event denoted by "A2", which is triggered when the serving cell (i.e., the serving base station) becomes worse than a threshold, and the LTE event denoted by "A3", which is triggered when a neighboring cell (i.e., a neighboring base station) becomes better than the serving cell by a positive or negative offset. Other well-known reporting events such as the LTE events denoted by "A1", "A4" and "A5" may also define the predefined handover condition. The reported information, which is a handover-related information and will be designated hereafter as the second information, gives an indication not only on the reference signal measurements but also on the handover reporting criteria/events. The second information is directed both towards a second input terminal, denoted by "in2", of the adjustment device located in the serving base station (step depicted by the number "2" in parentheses) and towards a handover decision unit (step depicted by the number "4" in parentheses) through which the serving base station verifies whether decision criteria are met. If met, the serving base station can then proceed to a handover execution by selecting the target base station and allowing the current communication between the UE device and the serving base station to be handed over from the serving base station towards the target base station.

Figure 3:
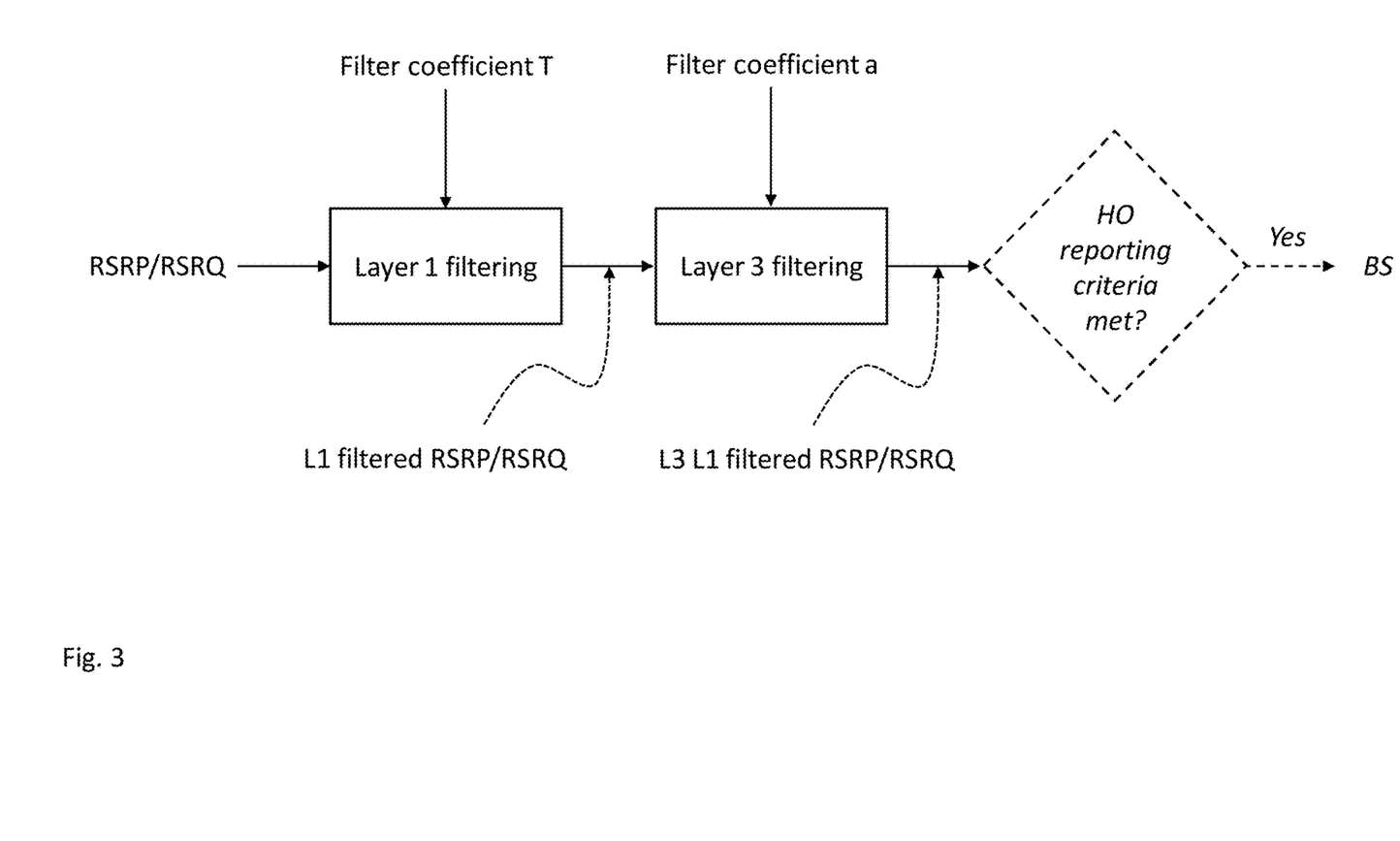
FIG. 3 shows a schematic block diagram illustrating a double filtering procedure applied to the reference signal measurements RSRP and/or RSRQ according to an embodiment.

As shown in FIG. 3, these reference signal measurements may be submitted to a double filtering procedure before reporting them from the UE device to the serving base station when the verification of the above-mentioned predefined handover condition is met. In more details, instantaneous RSRP and/or RSRQ measurements may be first filtered through a layer 1 (L1) filter having a filter coefficient denoted by "T", where L1 represents the physical layer of the radio interface. Further, the L1 filtering procedure is usually a sliding-window filtering with a typical sliding-window size ranging from 200 to 400 ms. The resulting L1 filtered RSRP and/or RSRQ measurements may be then filtered through a layer 3 (L3) filter having a filter coefficient denoted by "a", where L3 represents the radio resource control (RRC) layer of the radio interface.

Figure 4:
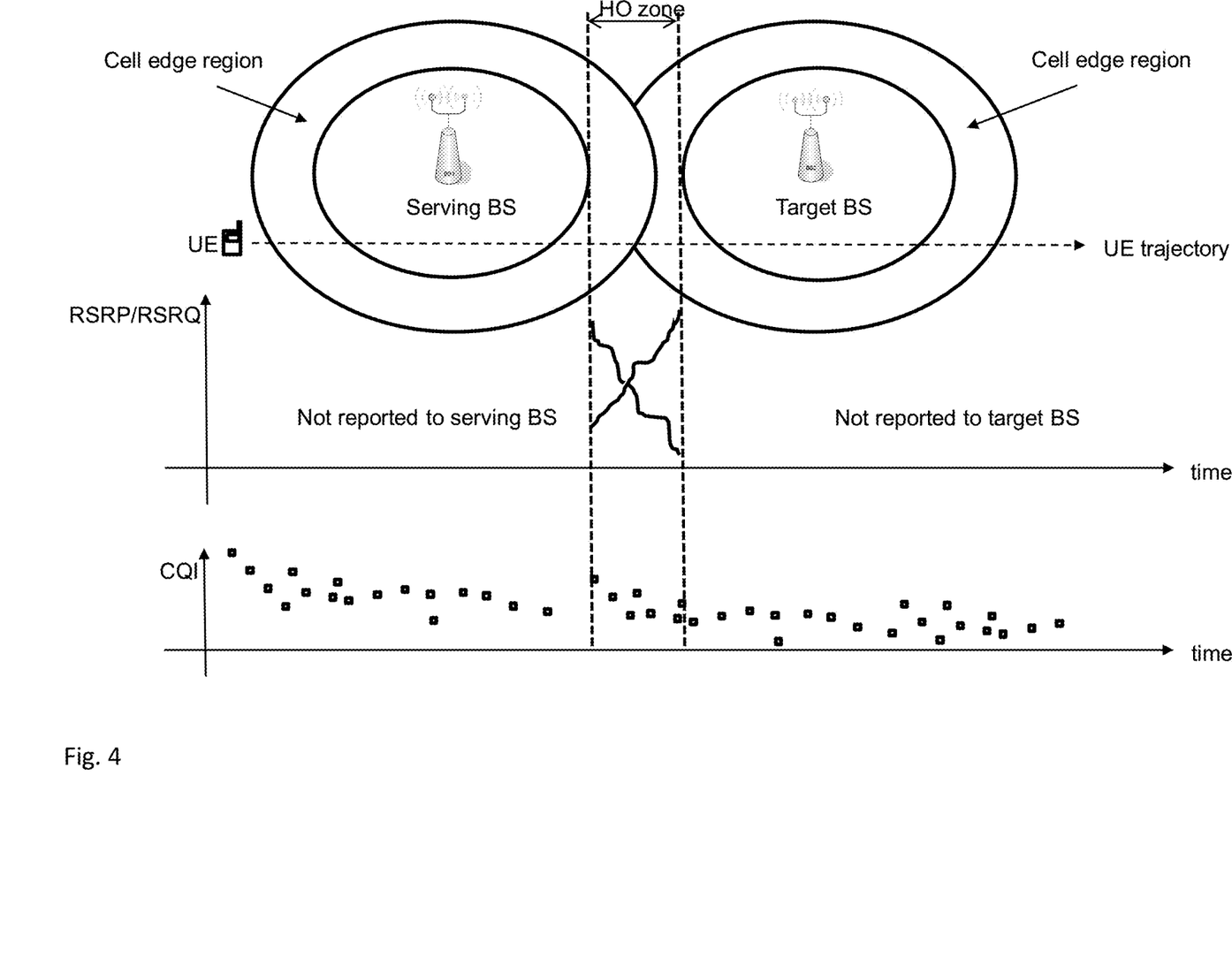
FIG. 4 shows a schematic diagram illustrating the measurements reported over time by a UE device moving from its serving base station towards its target base station according to an embodiment.

FIG. 4 shows a schematic diagram illustrating the measurements reported over time by a UE device moving from its serving base station towards its target base station according to an embodiment of the invention. As can be gathered therein, the UE device moves along a trajectory from its serving base station, also sometimes referred to as its source base station, towards its target base station through an overlapping region of the cell edge regions of the respective serving and target base stations, where the overlapping region represents the depicted handover zone. The CQI measurements are reported as long as they are available, whereas the reference signal measurements (i.e., RSRP and/or RSRQ) are reported only when the UE device enters the handover zone and the verification of the predefined handover condition is met. All these CQI and reference signal measurements may be collected and stored in a dedicated database.

Figure 5:
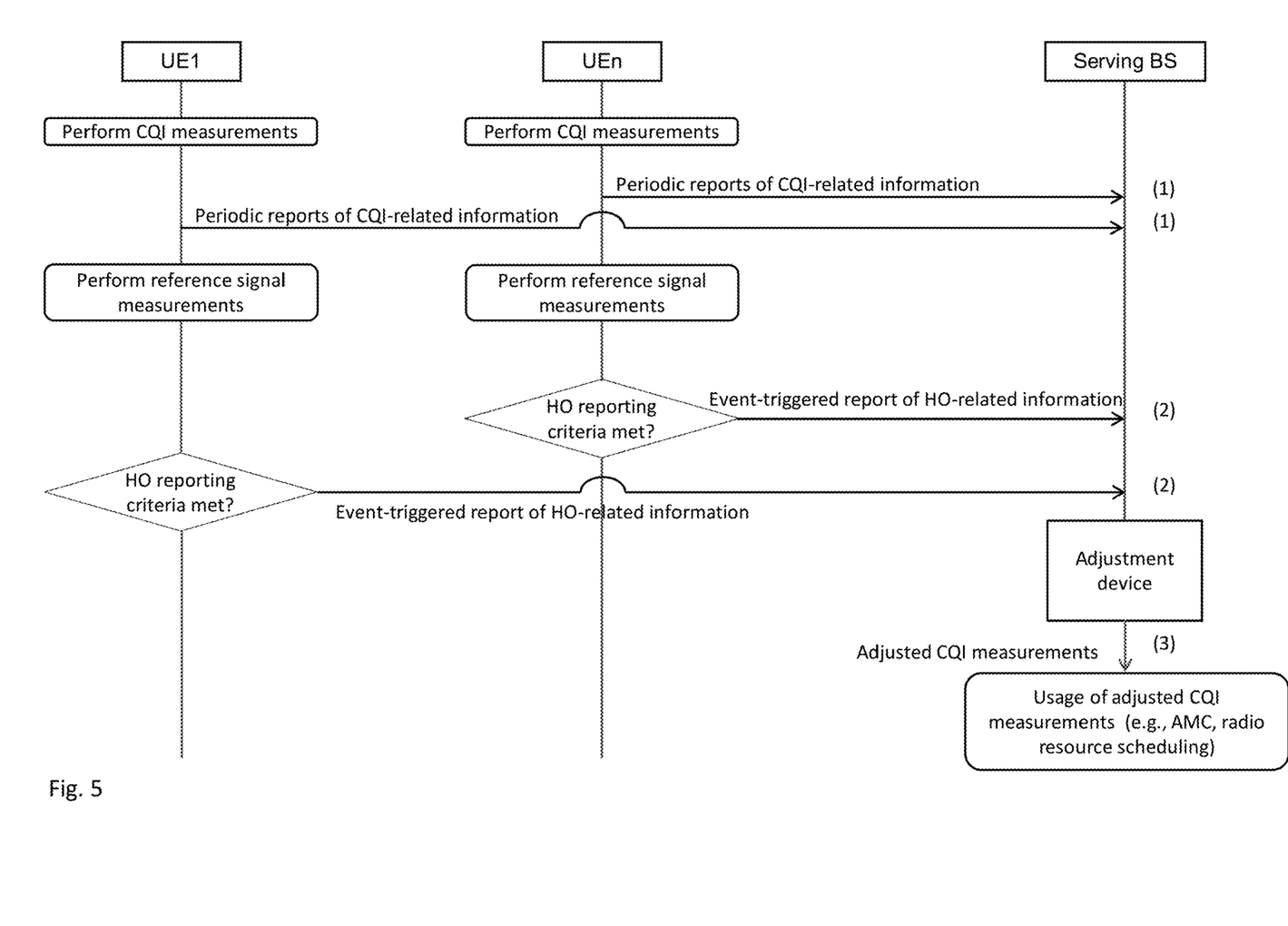
FIG. 5 shows a schematic flow diagram at the network level illustrating the steps of FIG. 1 numbered from (1) to (3) in the case where multiple UE devices are attached to the same serving base station, according to an embodiment.

Referring to FIG. 1, the steps that are numbered from (1) to (3) are illustrated at the network level in the schematic flow diagram of FIG. 5 in the case where multiple UE devices (each being identified by its own id value) are attached to the same serving base station, according to an embodiment of the invention.

Figure 6:
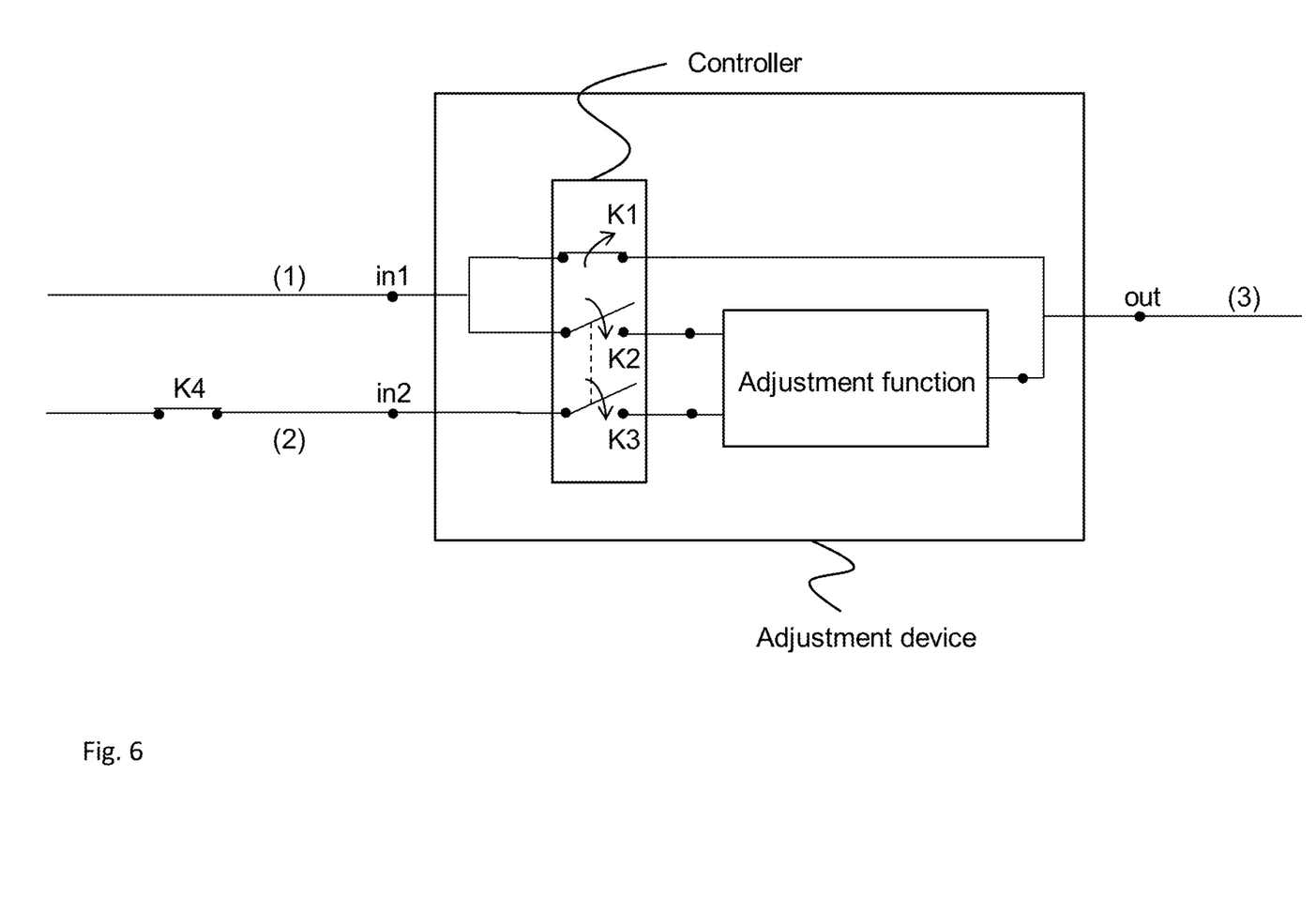
FIG. 6 shows a detailed schematic view of the adjustment device of FIG. 1 according to an embodiment.

FIG. 6 shows a detailed schematic view of the adjustment device of FIG. 1 according to an embodiment of the invention.

As depicted in FIG. 6, the adjustment device may comprise a controller and an adjustment function entity. Therein, the verification of the predefined handover condition is schematically represented by a switching device denoted by "K4", which is turned OFF when this verification is not met and turned ON when this verification is met. In other terms, K4 is turned OFF when the UE device is outside the handover zone and turned ON when the UE device enters the handover zone and remains located therein. The controller may internally control three switching devices, respectively denoted by "K1", "K2" and "K3", according to a switching sequence featuring the embodiments of the invention. Thus, the controller may be adapted to receive, from the UE device, the first information and, when the UE device is in the handover zone, the second information, and also adapted to transmit, according to the switching sequence, either the first information alone or the first information together with the second information. For its part, the adjustment function entity may be adapted to receive, from the controller according to the switching sequence, the first information together with the second information, and also adapted to adjust the first information based on the second information by modifying said first information or keeping it unchanged. In an exemplary implementation, each switching device amongst K1, K2 and K3 may be a respective single pole, single throw (SPST) switch. In another exemplary implementation, K1 may be a SPST switch and K2 together with K3 may be a double pole, single throw (DPST) switch.

Figure 7:
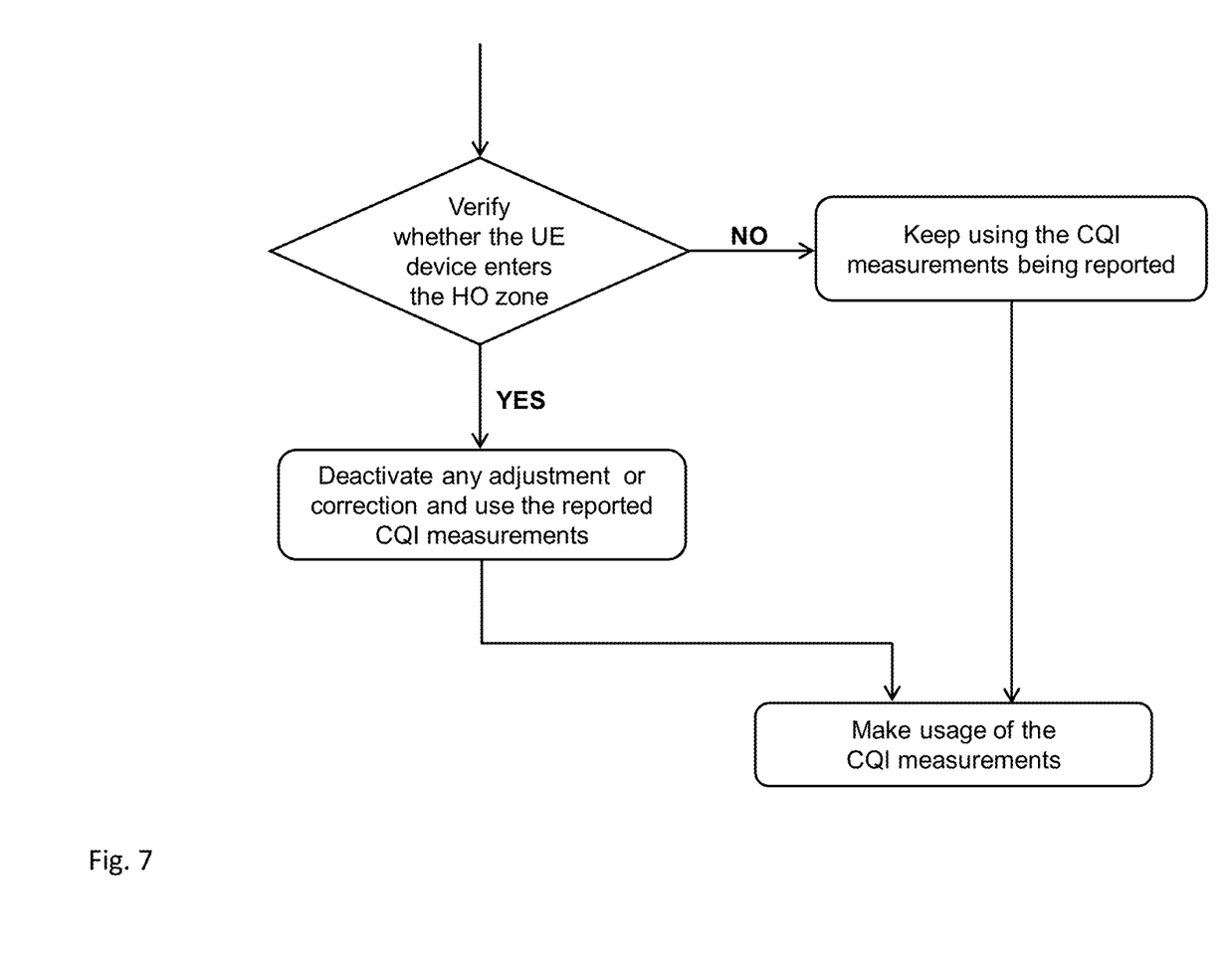
FIG. 7 shows a schematic flow diagram illustrating a first method for adjusting the CQI measurements according to an embodiment.

FIG. 7 shows a schematic flow diagram illustrating a first method for adjusting the CQI measurements according to an embodiment of the invention.

In the embodiment of the above-mentioned first method, the serving base station verifies whether the UE device enters the handover zone by verifying whether the second information (and through which the reference signal measurements) is provided at the input terminal (denoted by "in2") of the adjustment device. When the UE device enters the handover zone, it is usually subject to undergo increasing levels of interference due to its trajectory towards the neighboring base stations and to get lower signal levels from its serving base station, which may lead to a significant gap, mainly due to the transmission delay, between used and measured CQI values as reported by the UE device when it is in the handover zone and thereby lead to an important performance loss. If the second information is provided (i.e., if the UE device is in the handover zone), then the controller of FIG. 6 deactivates any adjustment or correction in the network and transmits only the first information (and through which the CQI measurements) as reported by the UE device, towards the output terminal (denoted by "out") of the adjustment device in order to allow the usage of the corresponding CQI measurements included in that first information. If the second information is not provided (i.e., if the UE device is outside the HO zone), then the controller of FIG. 6 transmits only the first information (and through which the CQI measurements) as being reported by the UE device, towards the output terminal (denoted by "out") of the adjustment device in order to allow the usage of the corresponding CQI measurements included in that first information. Referring to FIG. 6, this embodiment corresponds to the following switching sequence of the controller: K1 ON, K2 OFF, K3 OFF.

Figure 8:
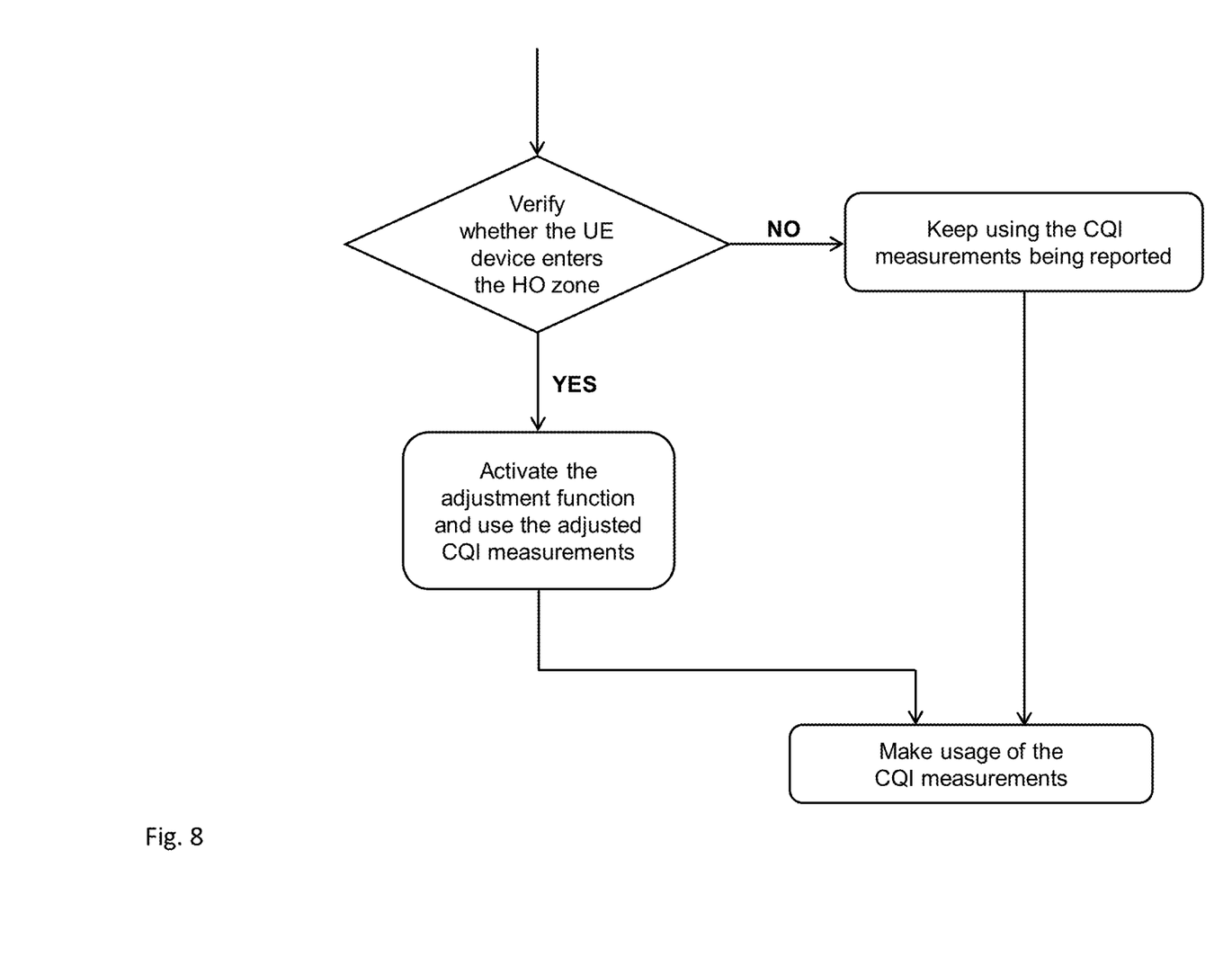
FIG. 8 shows a schematic flow diagram illustrating a second method for adjusting the CQI measurements according to an embodiment.

FIG. 8 shows a schematic flow diagram illustrating a second method for adjusting the CQI measurements according to an embodiment of the invention.

In the embodiment of the above-mentioned second method, the serving BS verifies whether the UE device enters the handover zone by verifying whether the second information (and through which the reference signal measurements) is provided at the input terminal (denoted by "in2") of the adjustment device. If the second information is provided (i.e., if the UE device is in the handover zone), then the controller of FIG. 6 activates the adjustment function entity and transmits the first information (and thereby the CQI measurements) together with the second information towards that adjustment function entity. The adjustment function entity adjusts the first information based on the second information and in turn transmits the adjusted first information towards the output terminal (denoted by "out2") of the adjustment device in order to allow the usage of the corresponding adjusted CQI measurements included in that adjusted first information. If the second information is not provided (i.e., if the UE device is outside the handover zone), then the controller of FIG. 6 transmits only the first information as being reported by the UE device, directly towards the output terminal (denoted by "out") of the adjustment device in order to allow the usage of the corresponding CQI measurements included in that first information. Referring to FIG. 6, this embodiment corresponds to the following switching sequence of the controller: K1 OFF, K2 ON, K3 ON.

In the embodiment of the above-mentioned second method, the adjustment of the first information based on the second information may be performed by the adjustment function entity using a confidence interval. In a first configuration, the adjustment function entity may adjust the first information starting from both the first information as received from the controller (i.e., from the UE device) and the second information as received from the controller (i.e., from the UE device). In a second configuration, both the first information and the second information may be submitted to a respective prediction procedure (either identical or different) and the adjustment function entity may adjust the first information starting from the resulting predicted first and second information. In a third configuration, only the second information may be submitted to a prediction procedure and the adjustment function entity may adjust the first information starting from the first information as received from the controller (i.e., from the UE device) and the resulting predicted second information. In a fourth configuration, only the first information may be submitted to a prediction procedure and the adjustment function entity may adjust the first information starting from the resulting predicted first information and the second information as received from the controller (i.e., from the UE device). Generally speaking, a conventional prediction procedure applied to an information consists in an estimation of the information at a predefined future time, which enables to correct this information into a corrected predicted information by accounting for the delay between the time when the information is received and the time when it is actually used in the network.

Figure 9:
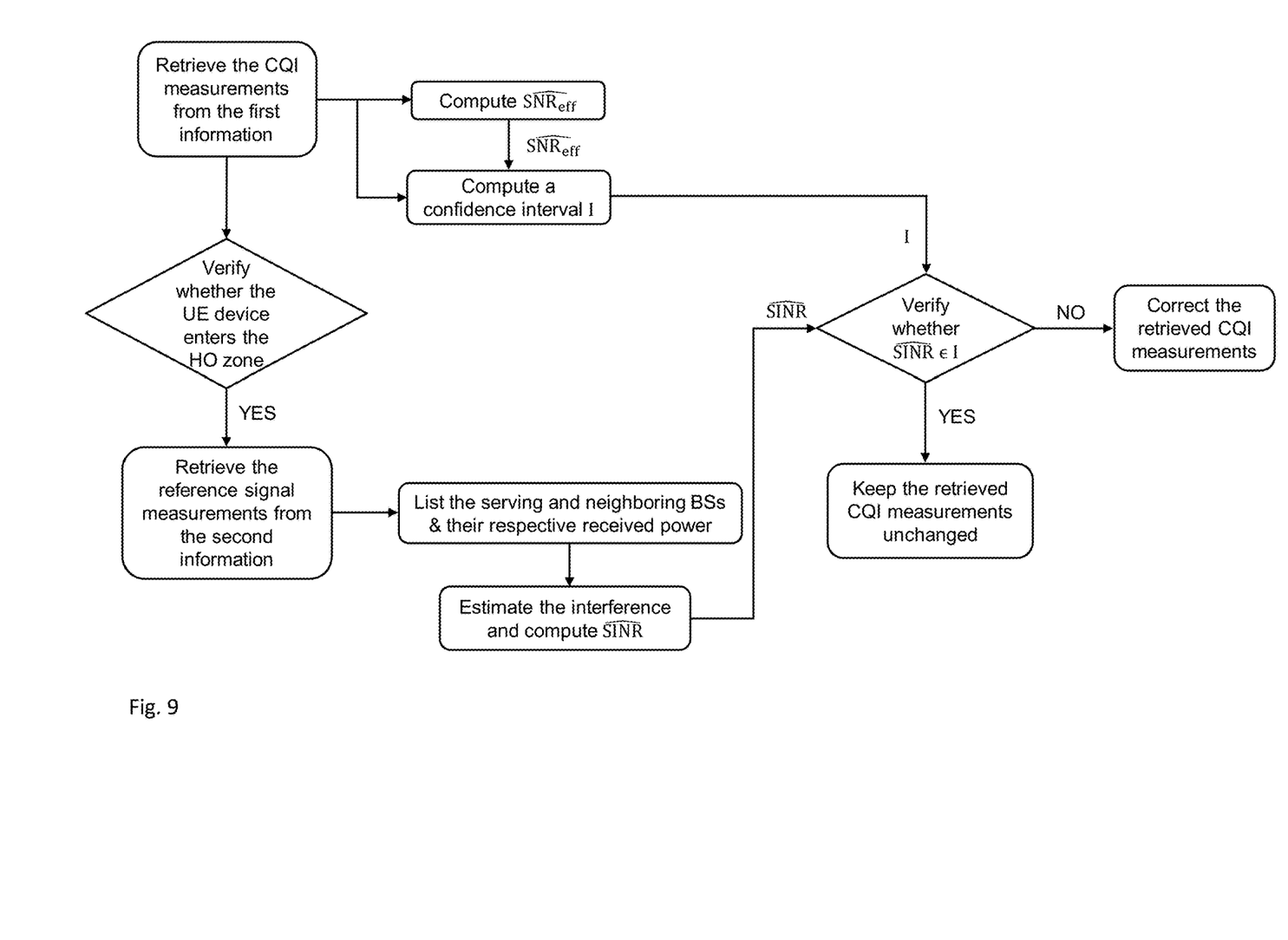
FIG. 9 shows a schematic flow diagram detailing the second method in the case of a first configuration according to an embodiment.

FIG. 9 shows a schematic flow diagram detailing the second method in the case of the first configuration according to an embodiment of the invention.

In the above-mentioned first configuration, the second method basically consists in using the reference signal measurements (i.e., RSRP, RSRQ) in order to correct the SINR based on an estimated interference from the neighboring base stations. Indeed, when a UE device gets closer to the cell edge, it receives a lower useful signal power from its serving base station as well as a higher interference level due to the transmission of the neighboring base stations. On one hand, the CQI measurements are computed accounting for in-band interference due to the actual scheduling of the neighboring base stations. On the other hand, the reference signals (i.e., RSRP, RSRQ) always detect the neighboring base stations and the reported measurement values are averaged over the entire band and during a longer period.

As depicted in FIG. 9, the CQI measurements are retrieved from the received first information, and an estimation of an effective SNR denoted by "$SNR_{\it eff}$" is derived from the following relationship:

$$\widehat{SNR}_{\it eff} = f(CQI) \quad (1)$$

where $\widehat{SNR}_{\it eff}$ is an estimated value of $SNR_{\it eff}$ and f is a reverse function mapping CQI to the highest SNR through, for example, a dedicated mapping table.

Afterwards, based on the observations of the retrieved CQI measurements, a confidence interval at 95% denoted by "I" is computed as follows:

$$I = \left[ p - 1.96\sqrt{\frac{p(1-p)}{n}}; p + 1.96\sqrt{\frac{p(1-p)}{n}} \right] \approx \left[ p - \frac{1}{\sqrt{n}}; p + \frac{1}{\sqrt{n}} \right] \quad (2)$$

where p and n designate the estimated probability and the observation bins number, respectively.

In turn, the reference signal measurements (i.e., RSRP, RSRQ) are retrieved from the second information when the UE device is in the handover zone, and an estimation of the SINR is derived, after listing the serving and neighboring base stations and their respective received power, from the following relationship:

$$\widehat{SINR} = RSRP_{dB}^{serving} - \Sigma_{j \not\subseteq Serving} RSRP_{dB}^{j} \quad (3)$$

where $\widehat{SINR}$ is an estimated value of SINR.

Next, $\widehat{SINR}$ is compared to the confidence interval I. If $\widehat{SINR}$ is within the confidence interval I (i.e., $\widehat{SINR} \in I$) around $\widehat{SNR}_{\it eff}$, then the retrieved CQI measurements keep unchanged. Otherwise, if $\widehat{SINR}$ is outside the confidence interval I, then a gap exists between $\widehat{SINR}$ and $\widehat{SNR}_{\it eff}$ and the retrieved CQI measurements are modified through a correction procedure into corrected CQI measurements. The correction procedure may consist in applying an adaptive bias accounting for the difference between $\widehat{SINR}$ and $\widehat{SNR}_{\it eff}$. The adaptive bias may, for example, be computed using non-linear algorithms.

Figure 10:
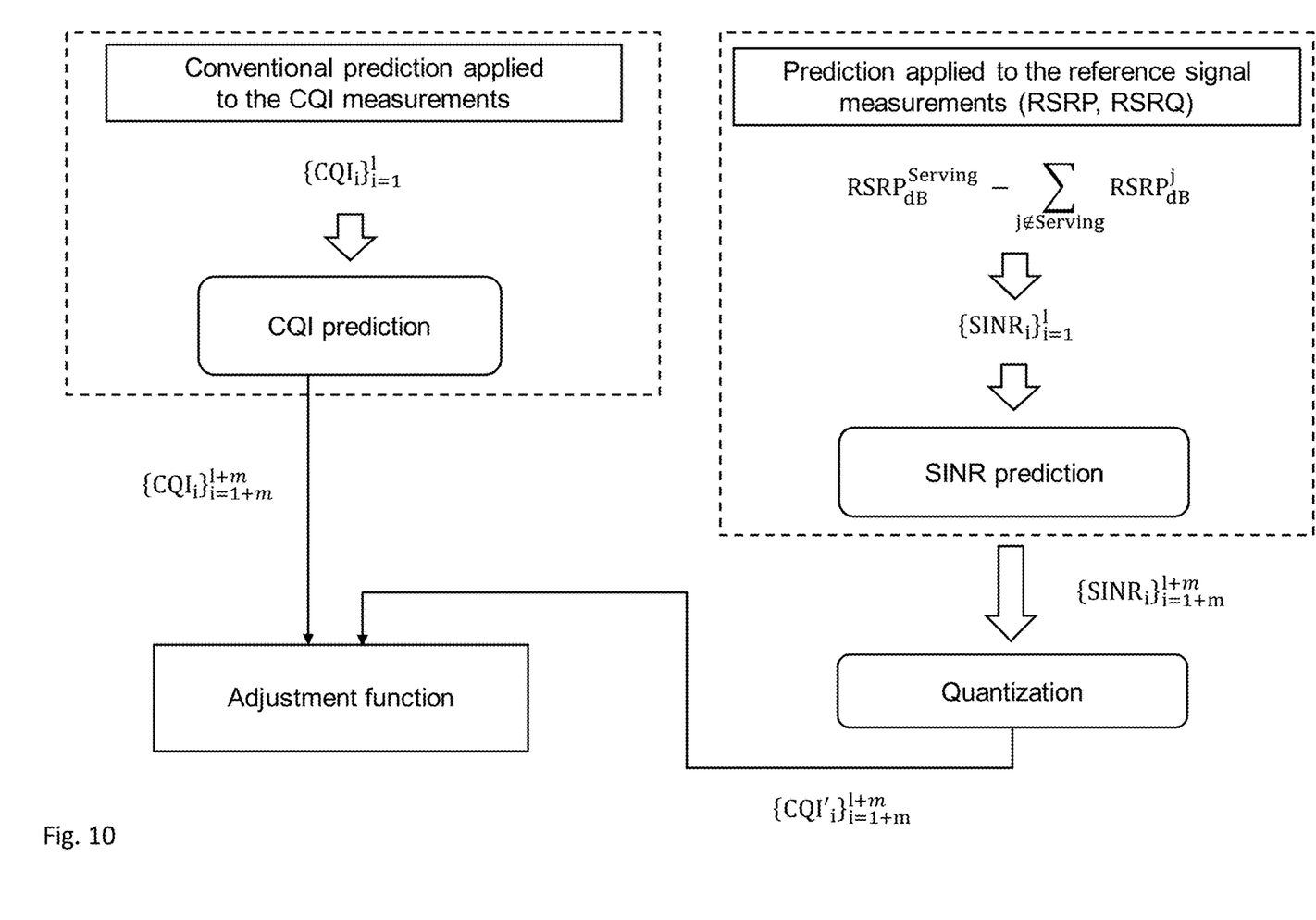
FIG. 10 shows a schematic flow diagram illustrating the prediction procedure of the second configuration of the second method according to an embodiment.

FIG. 10 shows a schematic flow diagram illustrating the prediction procedures of the second configuration of the second method according to an embodiment of the invention.

As can be gathered therefrom, a conventional prediction procedure is applied to the CQI measurements (depicted as $\{CQI_i\}_{i=1}^{l}$), which are retrieved from the received first information, in order to obtain predicted CQI measurements (depicted as $\{CQI_i\}_{i=1+m}^{l+m}$), namely CQI measurements being estimated at a predefined future time. These predicted CQI measurements (depicted as $\{CQI_i\}_{i=1+m}^{l+m}$) are then transmitted towards the adjustment function entity. Additionally, another prediction procedure is applied to the reference signal measurements (i.e., RSRP, RSRQ), which are retrieved from the second information when the UE device is in the handover zone. Afterwards, an estimation of the SINR (depicted as $\{SINR_i\}_{i=1}^{l}$) is derived, after listing the serving and neighboring base stations and their respective received power, from the aforementioned relationship (3). A prediction procedure is then applied to the estimated SINR in order to obtain a predicted estimated SINR (depicted as $\{SINR_i\}_{i=1+m}^{l+m}$). A quantization procedure is applied to this predicted estimated SINR in order to obtain a quantized predicted estimated SINR and to retrieve the corresponding predicted CQI values (depicted as $\{CQI'_i\}_{i=1+m}^{l+m}$) by using, for example, a mapping table retrieving a value ranging from 0 to 15. These predicted CQI values (depicted as $\{CQI'_i\}_{i=1+m}^{l+m}$) are then transmitted towards the adjustment function entity.

A confidence interval denoted by "$I_p$" around the predicted CQI measurements (depicted as $\{CQI_i\}_{i=1+m}^{l+m}$) may then be computed, and the predicted CQI values (depicted as $\{CQI'_i\}_{i=1+m}^{l+m}$) may be compared to this confidence interval $I_p$. If they are within the confidence interval $I_p$ (i.e., $\{CQI'_i\}_{i=1+m}^{l+m} \in I_p$), then the retrieved predicted CQI measurements (depicted as $\{CQI_i\}_{i=1+m}^{l+m}$) keep unchanged. Otherwise, if they are outside the confidence interval $I_p$, then a gap exists between the predicted CQI values (depicted as $\{CQI'_i\}_{i=1+m}^{l+m}$) and the predicted CQI measurements (depicted as $\{CQI_i\}_{i=1+m}^{l+m}$), and the retrieved predicted CQI measurements (depicted as $\{CQI_i\}_{i=1+m}^{l+m}$) are modified through a correction procedure into corrected predicted CQI measurements.

Finally, the invention has the benefit of making usage of existing handover-related measurements, which are reported when a handoverevent is detected, in order to optimize an adjustment of the CQI measurements. Thereby, no extra measurement is requested. By adjusting the CQI measurements, our invention allows to decrease the capacity loss due to delayed CQI reports. Thereby, the overall system capacity can highly increase. In a high mobility scenario (with respect to a moving client device), the invention can be beneficial to increase the accuracy of the reported CQI measurements and to improve the handover control quality. After the handover-execution takes place and once the UE device is attached to the target base station (which hence becomes the new serving base station), the invention may also be used for an optimal initialization of the CQI measurements of the channel between this UE device and this new serving base station, and may by the way be used for an optimal initialization of the MCS selected. Indeed, estimated CQI measurements may, at the target base station (i.e., the new serving base station), be derived only from the handover-related measurements as the CQI measurements are not yet available. These estimated CQI measurements may then be adjusted (i.e., modified or kept unchanged) based on the available handover-related measurements using the same above-mentioned first and/or second methods of the invention. Thereby, the convergence may be accelerated and the quality of the links may be enhanced in comparison with a static predefined initialization as it is done nowadays.

In summary, embodiments of the invention relates to an apparatus for adjusting channel quality indicator measurements of a channel between a client device and a serving device within a wireless communication system. The apparatus includes a controller adapted to receive, from the client device, a first information and, when the client device is in a handover zone, a second information. The controller is further adapted to transmit according to a switching sequence either the first information alone or the first information together with the second information. The apparatus also includes an adjustment function entity adapted to receive the first information together with the second information and adapted to adjust the first information based on the second information by modifying said first information or keeping it unchanged. The first information is related to the CQI measurements, while the second information is related to a handover, and in particular to handover-related measurements like RSRP and/or RSRQ.

While the invention has been illustrated and described in detail in the drawings and the foregoing description, such illustration and description are to be considered illustrative or exemplary and not restrictive. The invention is not limited to the disclosed embodiments. From reading the disclosure, other modifications will be apparent to a person skilled in the art. Such modifications may involve other features, which are already known in the art and may be used instead of or in addition to features already described herein.

The invention has been described in conjunction with various embodiments herein. However, other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems.

Although the invention has been described with reference to specific features and embodiments thereof, it is evident that various modifications and combinations can be made thereto without departing from the spirit and scope of the invention. The specification and drawings are, accordingly, to be regarded simply as an illustration of the invention as defined by the appended claims, and are contemplated to cover any and all modifications, variations, combinations or equivalents that fall within the scope of the invention.

The invention claimed is:

1. An apparatus for adjusting channel quality indicator (CQI) measurements of a channel between a client device and a serving device within a wireless communication system, the apparatus comprising:
   a controller, the controller adapted to:
      receive, from the client device, a first information and, when the client device is in a handover zone, a second information; and
      transmit, according to a switching sequence, either the first information alone or the first information together with the second information;
   an adjustment function entity, the adjustment function entity adapted to:
      receive, from the controller according to the switching sequence, the first information together with the second information; and
      adjust the first information based on the second information by modifying said first information or keeping it unchanged,
   wherein the first information is related to the CQI measurements and the second information is related to the handover,
   wherein the adjustment of the first information is based on a confidence interval,
   wherein the adjustment function entity is adapted to adjust the first information by:
      performing a prediction procedure applied to the first information to obtain a predicted first information, the prediction procedure comprising an estimation of the first information at a predefined future time;
      performing another prediction procedure applied to the second information to obtain a predicted second information, the other prediction procedure comprising an estimation of the second information at the predefined future time;
      performing a quantization procedure applied to the predicted second information to obtain a quantized predicted second information;
      computing the confidence interval around the predicted first information;
      if the quantized predicted second information is within the confidence interval, keeping the predicted first information unchanged and modifying the first information into the predicted first information; and
      if the quantized predicted second information is outside the confidence interval, correcting the predicted first information into a corrected predicted first information and modifying the first information into the corrected predicted first information.

2. The apparatus of claim 1, wherein the controller is further adapted to:
   deactivate any adjustment or correction when the client device is in the handover zone, and the first information alone is transmitted towards an output of the apparatus.

3. The apparatus of claim 1, wherein the controller is further adapted to:
   activate the adjustment function entity when the client device is in the handover zone, and wherein the first information together with the second information are transmitted towards the adjustment function entity.

4. The apparatus of claim 1, wherein the adjustment function entity is adapted to adjust the first information by:
   deriving an estimated signal-to-noise ratio (SNR) from the first information;
   computing the confidence interval around the estimated SNR;
   deriving an estimated signal-to-interference-plus-noise ratio (SINR) from the second information;
   if the estimated SINR is within the confidence interval, keeping the first information unchanged; and if the estimated SINR is outside the confidence interval, modifying the first information through a correction into a corrected first information.

5. The serving device of claim 1, wherein the serving device is a base station or an evolved nodeB (eNodeB) or any other network-capable entity.

6. A method for adjusting channel quality indicator (CQI) measurements of a channel between a client device and a serving device within a wireless communication system, the method comprising:
  receiving, at a controller and from the client device, a first information and, when the client device is in a handover zone, a second information;
  transmitting, according to a switching sequence, either the first information alone or the first information together with the second information;
  receiving, at an adjustment function entity and from the controller according to the switching sequence, the first information together with the second information; and
  adjusting, at the adjustment function entity, the first information based on the second information by modifying said first information or keeping it unchanged,
  wherein the first information is related to the CQI measurements and the second information is related to the handover,
  wherein the step of adjusting the first information is based on a confidence interval,
  wherein the step of adjusting the first information comprises:
  performing a prediction procedure applied to the first information as to obtain a predicted first information, the prediction procedure comprising an estimation of the first information at a predefined future time;
  performing another prediction procedure applied to the second information as to obtain a predicted second information, the other prediction procedure comprising an estimation of the second information at the predefined future time;
  performing a quantization procedure applied to the predicted second information as to obtain a quantized predicted second information;
  computing the confidence interval around the predicted first information;
  if the quantized predicted second information is within the confidence interval, keeping the predicted first information unchanged and modifying the first information into the predicted first information; and
  if the quantized predicted second information is outside the confidence interval, correcting the predicted first information into a corrected predicted first information and modifying the first information into the corrected predicted first information.

7. The method of claim 6, further comprising:
  deactivating any adjustment or correction when the client device is in the handover zone, and
transmitting the first information alone towards an output of the apparatus.

8. The method of claim 6, further comprising:
  activating the adjustment function entity when the client device is in the handover zone, transmitting the first information together with the second information towards the adjustment function entity.

9. The method of claim 6, wherein the step of adjusting the first information comprises:
  deriving an estimated signal-to-noise ratio (SNR) from the first information;
  computing the confidence interval around the estimated SNR;
  deriving an estimated signal-to-interference-plus-noise ratio (SINR) from the second information;
  if the estimated SINR is within the confidence interval, keeping the first information unchanged; and
  if the estimated SINR is outside the confidence interval, modifying the first information through a correction into a corrected first information.

10. The method of claim 6, wherein the step of performing another prediction procedure applied to the second information comprises:
  deriving an estimated SINR from the second information; and
  obtaining a predicted estimated SINR as the predicted second information.

11. A computer program product, comprising a program code stored on a non-transitory computer readable medium, wherein when the program code is executed on a computer, for performing a method comprising:
  receiving, at a controller and from the client device, a first information and, when the client device is in a handover zone, a second information;
  transmitting, according to a switching sequence, either the first information alone or the first information together with the second information;
  receiving, at an adjustment function entity and from the controller according to the switching sequence, the first information together with the second information; and
  adjusting, at the adjustment function entity, the first information based on the second information by modifying said first information or keeping it unchanged,
  wherein the first information is related to the CQI measurements and the second information is related to the handover,
  wherein the step of adjusting the first information is based on a confidence interval,
  wherein the step of adjusting the first information comprises:
  performing a prediction procedure applied to the first information as to obtain a predicted first information, the prediction procedure comprising an estimation of the first information at a predefined future time;
  performing another prediction procedure applied to the second information as to obtain a predicted second information, the other prediction procedure comprising an estimation of the second information at the predefined future time;
  performing a quantization procedure applied to the predicted second information as to obtain a quantized predicted second information;
  computing the confidence interval around the predicted first information;
  if the quantized predicted second information is within the confidence interval, keeping the predicted first information unchanged and modifying the first information into the predicted first information; and
  if the quantized predicted second information is outside the confidence interval, correcting the predicted first information into a corrected predicted first information and modifying the first information into the corrected predicted first information.

* * * * *